US010853361B2

(12) United States Patent
Liensberger et al.

(10) Patent No.: US 10,853,361 B2
(45) Date of Patent: Dec. 1, 2020

(54) SCENARIO BASED INSIGHTS INTO STRUCTURE DATA (71) Applicant: Microsoft Technology Licensing, LLC, Redmond, WA (US)

(72) Inventors: Christian Liensberger, Bellevue, WA (US); Qunshu Zhang, Redmond, WA (US); Maxim Uritsky, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 14/593,130

(22) Filed: Jan. 9, 2015

(65) Prior Publication Data

US 2015/0120711 A1 Apr. 30, 2015

Related U.S. Application Data (63) Continuation of application No. 13/471,707, filed on May 15, 2012.

(51) Int. Cl.
*G06F 16/2452* (2019.01)
*G06F 16/245* (2019.01)
(Continued)

(52) U.S. Cl.
CPC ........ *G06F 16/24522* (2019.01); *G06F 15/16* (2013.01); *G06F 16/245* (2019.01);
(Continued)

(58) Field of Classification Search
CPC ........ G06F 17/30554; G06F 17/30867; G06F 16/24522; G06F 40/30; G06F 16/2452;
(Continued)

(56) References Cited

U.S. PATENT DOCUMENTS 5,913,214 A * 6/1999 Madnick .......... G06F 17/30427
6,282,537 B1 8/2001 Madnick et al.
(Continued)

FOREIGN PATENT DOCUMENTS

CN 1647076 7/2005
CN 101401062 4/2009
(Continued)

OTHER PUBLICATIONS

"Ways to sum values in a worksheet", Microsoft, Available at least as early as Apr. 2016, Available at <<https://support.office.com/en-us/article-Ways-to-sum-values-in-a-worksheet-abc19590-16ac-4fa3-9719-9e2ae5a4ae3e>>.
(Continued)

*Primary Examiner* — Cam Y T Truong
(74) *Attorney, Agent, or Firm* — Workman Nydegger (57) ABSTRACT Obtaining a single unified result for a query over a plurality of data sources. A query specifies an identity of a type of data that the query is providing, and an identity of a format and type of data the query is looking for as a specific answer to the query. The query is mapped to a query pattern from among a plurality of available query patterns. A set of two or more different data sources are queried using one or more queries that correspond to the query pattern. At least two results of querying the particular set of two more different data sources are received. A single unified result is derived from at least one of the results. The single unified result has the format and type of data query specified that the query was looking for as a specific answer to the query.

15 Claims, 6 Drawing Sheets

(51) Int. Cl.
*G06F 16/9535* (2019.01)
*G06F 40/30* (2020.01)
*G06F 15/16* (2006.01)
*H04L 12/58* (2006.01)
*G06F 40/20* (2020.01)

(52) U.S. Cl.
CPC ...... *G06F 16/2452* (2019.01); *G06F 16/9535* (2019.01); *G06F 40/30* (2020.01); *H04L 51/02* (2013.01); *H04L 51/046* (2013.01); *G06F 40/20* (2020.01)

(58) Field of Classification Search
CPC .... G06F 16/245; G06F 40/20; G06F 16/9535; G06F 15/16; H04L 51/02; H04L 51/046
See application file for complete search history.

(56) References Cited

U.S. PATENT DOCUMENTS

| | | | |
|---|---|---|---|
| 7,007,275 | B1 | 2/2006 | Hanson et al. |
| 7,676,519 | B2 | 3/2010 | McBride et al. |
| 8,065,316 | B1* | 11/2011 | Baker ............... G06F 17/30864 707/768 |
| 8,239,751 | B1* | 8/2012 | Rochelle ............... G06F 17/246 707/E17.032 |
| 9,548,050 | B2 | 1/2017 | Gruber et al. |
| 2002/0023091 | A1 | 2/2002 | Silberberg |
| 2003/0023607 | A1* | 1/2003 | Phelan ............... G06F 17/30545 |
| 2003/0182261 | A1 | 9/2003 | Patterson |
| 2005/0102065 | A1 | 5/2005 | McBride et al. |
| 2005/0131889 | A1* | 6/2005 | Bennett ............ G06F 17/30398 |
| 2005/0267871 | A1 | 12/2005 | Marchisio et al. |
| 2005/0278231 | A1* | 12/2005 | Teeter .................. G06Q 10/107 705/14.51 |
| 2005/0289124 | A1 | 12/2005 | Kaiser et al. |
| 2006/0190436 | A1* | 8/2006 | Richardson ......... G06F 17/3064 |
| 2007/0168323 | A1 | 7/2007 | Dickerman et al. |
| 2007/0192300 | A1 | 8/2007 | Reuther et al. |
| 2007/0220020 | A1 | 9/2007 | Goto |
| 2008/0244429 | A1* | 10/2008 | Stading ............. G06F 17/30554 715/764 |
| 2008/0294612 | A1 | 11/2008 | Wiles et al. |
| 2009/0006348 | A1* | 1/2009 | Gilula ............... G06F 17/30398 |
| 2009/0063437 | A1* | 3/2009 | Hendrey ............. H04L 63/0807 |
| 2009/0112835 | A1 | 4/2009 | Elder |
| 2009/0234799 | A1 | 9/2009 | Betawadkar-Norwood et al. |
| 2009/0271226 | A1 | 10/2009 | De Marcken |
| 2010/0161492 | A1 | 6/2010 | Harvey |
| 2010/0191760 | A1* | 7/2010 | Kusumura ............ G06F 16/258 707/760 |
| 2011/0047171 | A1 | 2/2011 | Paparizos et al. |
| 2011/0078105 | A1 | 3/2011 | Wallace |
| 2011/0161311 | A1* | 6/2011 | Mishne ............... G06F 17/3064 707/719 |
| 2011/0246484 | A1* | 10/2011 | Dumais ............... G06F 16/9535 707/749 |
| 2012/0079068 | A1* | 3/2012 | Wang ..................... H04W 4/18 709/217 |
| 2012/0110001 | A1 | 5/2012 | Young |
| 2012/0124032 | A1 | 5/2012 | Zelevinsky |
| 2012/0126032 | A1 | 5/2012 | Ambo |
| 2012/0166182 | A1* | 6/2012 | Ko ........................ G06F 17/276 704/9 |
| 2012/0243048 | A1* | 9/2012 | Asai ..................... G06F 3/1224 358/1.16 |
| 2012/0323889 | A1 | 12/2012 | Marum et al. |
| 2013/0006968 | A1 | 1/2013 | Gusmini et al. |
| 2013/0138670 | A1 | 5/2013 | Ludwig |
| 2013/0262501 | A1* | 10/2013 | Kuchmann-Beauger ................... G06F 17/30451 707/769 |
| 2013/0311447 | A1 | 11/2013 | Liensberger |

FOREIGN PATENT DOCUMENTS

| | | |
|---|---|---|
| CN | 101908040 | 12/2010 |
| WO | WO 02/17101 | 2/2002 |

OTHER PUBLICATIONS

Office Action dated May 23, 2016 cited in U.S. Appl. No. 13/471,707.
Tarau, et al., "Knowledge Based Conversational Agents and Virtual Storytelling", In Proceedings of the ACM Symposium on Applied Computing, vol. 1, Mar. 14, 2004, pp. 39-44.
Wang, et al., "A Tool for Tree Pattern Matching", In Third International Conference on Tool for Artificial Intelligence, Nov. 10, 1991, pp. 436-444.
Office Action cited in U.S. Appl. No. 13/471,707 dated Nov. 1, 2013.
Office Action cited in U.S. Appl. No. 13/471,707 dated Jul. 9, 2014.
WolframAlpha, Oct. 16, 2011 http://web.archive.org/web/20111016194155/http://www.wolframalpha.com/input/?i=unemployment+rate+Las+Vegas+%2F+Boston.
"10 Amazing uses for Wolfram Alpha", Available at least as early as Feb. 2012. Available at <<http://www.howtogeek.com/106925/10-amazing-uses-for-wolfram-alpha/>>.
"Solve Domain and Range of a Function with WolframAlpha", Feb. 21, 2012. Available at <<http://blog.wolframalpha.com/2012/02/21/solve-domain-and-range-of-a-function-with-wolframalpha/>>.
Office Action dated Oct. 23, 2015 cited in U.S. Appl. No. 13/471,707.
Wolfram Alpha Basics, Feb. 12, 2012 http://web.archive.org/web/20120212001807/http://www.wolframalpha.com/tour/basics.
Office Action dated Jan. 23, 2017 cited in U.S. Appl. No. 13/471,707.
Office Action issued in Chinese Patent Application No. 201380025501.9 dated Dec. 15, 2016.
Office Action Issued in European Patent Application No. 13724079.2, dated Mar. 13, 2017, 6 Pages.
International Search Report and Written Opinion Issued in PCT Application No. PCT/US2013/039793, dated Jul. 31, 2013, 9 Pages.
"Wolfram|Alpha API: Developer FAQs", Retrieved from <<http://web.archive.org/web/20110823204056/http://products.wolframalpha.com/api/faqs.html>>, Aug. 23, 2011, 2 Pages.
"Wolfram|Alpha Community", Retrieved from <<https://web.archive.org/web/20090913184625/http://community.wolframalpha.com/viewtopic.phpf=23&d=856>>, Sep. 13, 2009, 1 Page.
Office Action dated Sep. 20, 2017 cited in U.S. Appl. No. 13/471,707.
Office Action issued in Chinese Application No. 201380025501.9 dated Aug. 7, 2017.
"Third Office Action Issued in Chinese Patent Application No. 201380025501.9", dated Feb. 2, 2018, 10 Pages.
"Office Action Issued in Chinese Patent Application No. 201380025501.9", dated Oct. 9, 2018, 9 Pages.
"Non-Final Office Action Issued in U.S. Appl. No. 15/488,990", dated Feb. 9, 2018, 22 Pages.
"Fourth Office Action Issued in Chinese Patent Application 201380025501.9", dated Jun. 27, 2018, 10 Pages.
"Fifth Office Action Issued in Chinese Patent Application No. 201380025501.9", dated Apr. 10, 2019, 12 Pages.
"The Analysis and Design of Heterogeneous Data Resources Integration Technology Based on LDAP", I138-304, Sep. 15, 2009, 23 Pages.

* cited by examiner

| | A | B | C | D | E | F | G |
|---|---|---|---|---|---|---|---|
| | SUM ▼ | □ ✗ ✓ *fx* | =DLOOKUP(Crime rate in " &A5) | | | | |
| 1 | | | | | | | |
| 2 | | | | | | | |
| 3 | Seattle | 3447 | | | | | |
| 4 | Boston | 6676 | | | | | |
| 5 | New York | =DLOOKUP(Crime rate in " &A5) | | | | | |
| 6 | | | | | | | |
| 7 | | | | | | | |
| 8 | MSFT | 30.56 | | | | | |
| 9 | | | | | | | |
| 10 | | | | | | | |

400 http://datamarketlookup.cl...    Administration dashboard

Administration dashboard

Welcome to the administration dashboard. This page let's you manage all patterns that are recognized by the DataMarket Lookup service. Click on "Add new pattern" to add a new pattern to the collection.

Add new pattern

| Text | Actions |
| --- | --- |
| Last high temperature in {City} | Edit Delete |
| Last market price for {Symbol} | Edit Delete |
| Stock Quote for {Symbol} | Edit Delete |
| Crime rate in {City} | Edit Delete |
| Translate '{Text}' to {Language} | Edit Delete |

*Figure 4*

Add new pattern

Provide all required fields to create a new pattern. The pattern is being matched by the lookup service and executed against the provided DataMarket services. *Parameters provided need to be enclosed with curly brackets (e.g. Crime statistics for {city}).*

Pattern: [________] ~ 502

The following are the service calls that are executed when the pattern is matched. *This can be defined as a chain of calls, where the returned fields of the first call are available as parameter for the second and so one, Return values need to match the fields returned by the service response and multiple fields need to be delimited by comma (e.g. URL: http://api.datamarket.com/CrimeStats?City+{city} – Return values:ViolentCrime, Robbery*

| | | |
|---|---|---|
| 1. URL: [____] | Returned fields: [____] | Cache timeout (in secs): [____] |
| 2. URL: [____] | Returned fields: [____] | Cache timeout (in secs): [____] |
| 3. URL: [____] | Returned fields: [____] | Cache timeout (in secs): [____] |

⎫
⎬ 504
⎭

The account key that's used to connect to the provided service URLs.

Account Key: [________]

[Save]

SCENARIO BASED INSIGHTS INTO STRUCTURE DATA

CROSS-REFERENCE TO RELATED APPLICATIONS

This application is a continuation of U.S. patent application Ser. No. 13/471,707, filed May 15, 2012, and entitled "SCENARIO BASED INSIGHTS INTO STRUCTURE DATA." The entire content of the foregoing application is incorporated by reference herein in its entirety.

BACKGROUND

Background and Relevant Art

Computers and computing systems have affected nearly every aspect of modern living. Computers are generally involved in work, recreation, healthcare, transportation, entertainment, household management, etc.

Modern computing systems have the capability to generate and store large amounts of data. For example, data may be collected by data collection mechanisms coupled to sensors, web services, or other data sources. The raw data can be operated on to create even more data. Mass storage is very inexpensive, so this data can be persisted for long periods of time, without the need to destroy the data to reclaim the storage space. Thus, large amounts of data can be generated and accumulated.

Because of the large amounts of data available, finding a particular piece of data is akin to the proverbial finding of a needle in a haystack. Difficulties can arise simply in searching through the large amounts of data. This can be compounded by a user not being able to craft effective search queries. In particular, various indexes and search engines can organize and make data searchable, but these tools are only as effective as a user performing a search allows them to be by constructing appropriate queries. Further, a user may have a desire to find data that cannot completely be provided by a single data store.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein is directed to a method that may be practiced in a distributed computing environment. The method includes acts for obtaining a single unified result for a query over a plurality of data sources. The method includes receiving a query from a user, the query including a hint specifying (i) an identity of a type of data that the query is providing, and (ii) an identity of a format and type of data the query is looking for as a specific answer to the query. The method further includes mapping the query to a particular query pattern from among a plurality of available query patterns. Each available query pattern comprises a first query portion and a second parameter portion, and defines one or more queries over a set of two or more different data sources, mapping the query to a particular query pattern comprising matching the type of data that the query is providing to the second parameter portion of each of the plurality of available query patterns.

The method further includes querying a particular set of two or more different data sources using the one or more queries that correspond to the particular query pattern, including receiving at least two results of querying the particular set of two more different data sources using the one or more queries that correspond to the particular query pattern. The method further includes deriving a single unified result from at least one of the results, the single unified result having the format and type of data the hint specified that the query was looking for as a specific answer to the query.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments described herein allow users to construct natural language queries on top of data that is exposed through a data platform that has a set of data providers from which it can provide data. One such data platform is the Windows Azure® Marketplace available from Microsoft Corporation of Redmond Wash. However, embodiments may be used with other storage that contains structured data.

The natural language query can be used as input by the system to form semantically appropriate queries for two or more of the data set providers, which can then be queried using the semantically appropriate queries. The results from the two or more providers can be aggregated and provided to the user as a single unified result.

Figure 1:
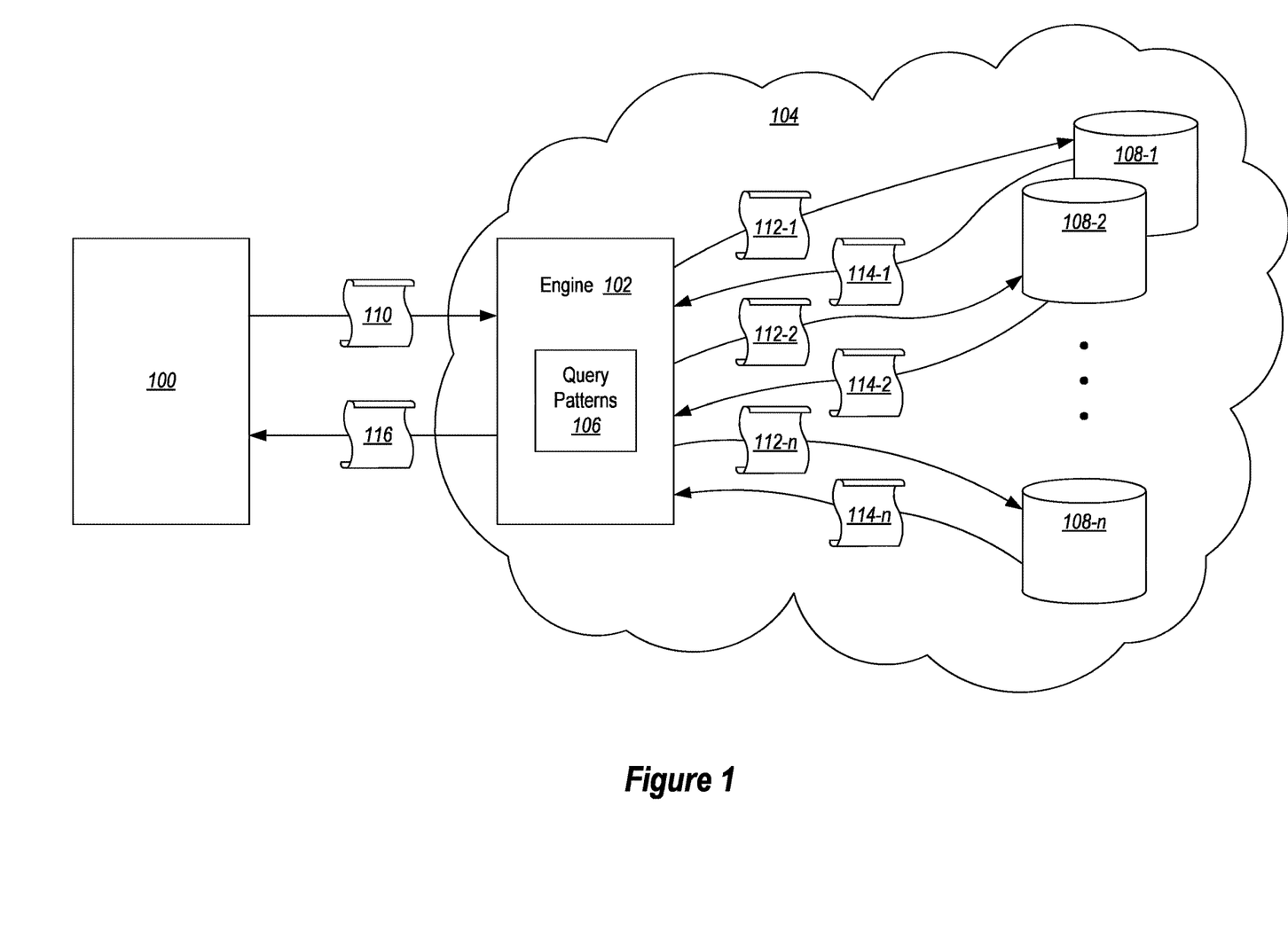
FIG. 1 illustrates an engine configured to receive queries in to translate the queries to semantically appropriate queries.

Referring now to FIG. 1, an example is illustrated. Some embodiments include an engine 102 located in a central location (e.g. in the cloud 104) that hosts a set 106 of query patterns that are coupled to the structured data in the underlying data store(s) 108-1, 108-2 through 108-n. A query 110 that is provided by a user 100 is mapped to the closest structured pattern from the query patterns 106 and the engine 102 then executes two or more of the queries 112-1, 112-2, and 112-m against two or more of the structured data stores 108-1, 108-2 through 108-n (where m and n in each case indicates some number of queries and some other number of data stores respectively such that while only three are specifically shown the ellipsis and variables m and n represent that other numbers of queries and data stores may be implemented). The queries against different data stores can be used together. For example, queries can be chained. Output (e.g. one of more of results 114-1, 114-2 or 114-m) from one or more earlier queries can be used in subsequent queries (e.g. one or more of 112-1 through 112-m). The result of the user query 110 and the selected query pattern queries (two or more of queries 112-1 through 112-m) is a specific value that is then returned as a result 116 to the user 100. This value is the answer to the question that the user 100 asked through the pattern.

The following illustrates an example: the natural language query "Crime rate in Seattle" maps to the pattern "Crime rate in {City}" this is then translated to a set of queries (such as OData queries, SQL queries or queries in another query language) against the structured data repository as appropriate for each given data repository. These queries result in a specific value that represents the crime rate in Seattle. This value is then returned to the user.

Figure 2:
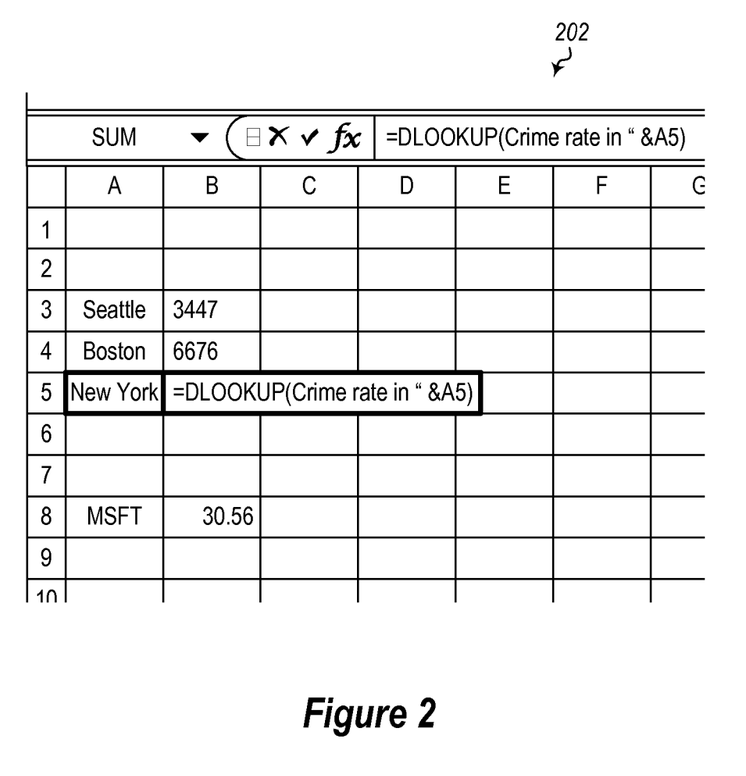
FIG. 2 illustrates a spreadsheet interface including specialized functions configured to handle natural language queries.

Some embodiments may be implemented in a spreadsheet application, such as Excel® available from Microsoft Corporation of Redmond Wash., using a Lookup or similar function. Such an example is illustrated in FIG. 2. FIG. 2 illustrates a user interface 202 of a spreadsheet application. Column B of the spreadsheet interface 202 includes a specialized Lookup command constructed as follows: =DLOOKUP("Crime rate in" &A5). The DLOOKUP command may have functionality for connection to an engine 102 and an associated set 106 of query patterns (see FIG. 1). A user can key in a city name into cell A5, and the DLOOKUP will return the crime rate for that city. This command is translated by the engine 102 to semantically appropriate queries that can be run against different data stores, such as data stores 108-1 through 108-n. The result can then be returned and displayed in cell B5. FIG. 2 further illustrates at row 8 an example of a stock quote. In this example, cell B5 may have a specialized Lookup command constructed as follows: =DLOOKUP ("Stock quote for" &A8)

Figure 3:
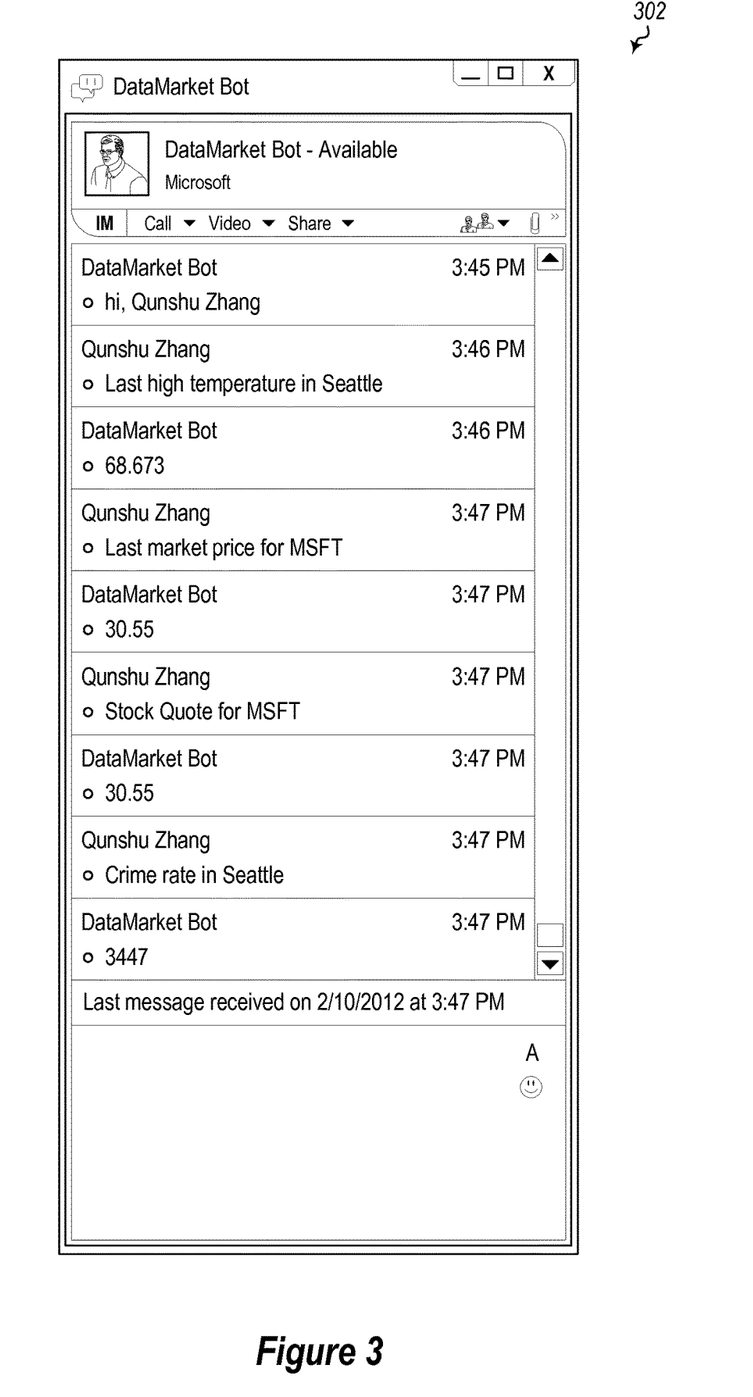
FIG. 3 illustrates a chat client configured to connect to a service that can receive natural language queries in chat form and translate the queries to semantically appropriate queries for underlying data stores.

Alternatively or additionally, embodiments may be implemented as a bot that can be used in an instant messaging client, such as Microsoft® Communicator. For example, a user may be able to use an instant messaging client to connect to an information service. Referring now to FIG. 3, an example is illustrated. FIG. 3 illustrates a user interface 302 for a messaging client. The user can ask natural language queries, as if the user were chatting with another human user. For example, FIG. 3 illustrates various natural languages queries including "Last high temperature in Seattle", "Last market price for MSFT", "Stock quote for MSFT", and "Crime rate in Seattle". The messaging client may be connected to a service that has access to the engine 102 and the set 106 of query patterns. Those natural language queries can be translated using the set 106 of query patterns to semantically appropriate queries (such as queries 112-1 through 112-m) for data repositories available to the information service (such as the repositories 108-1 through 108-n). These queries can then be used to obtain data through responses 114-1 through 114-m and to construct an answer to the user's natural language question and conveyed to the user through the response 116 as illustrated in the responses from DataMarket Bot illustrated in the user interface 302 of FIG. 3.

Alternatively or additionally, embodiments may be implemented as service that uses speech, such as a phone or other application. For example, a user can speak a natural language question into a phone or other computing device. That question can be translated to semantically appropriate queries for different data repositories available to the information service. These queries can then be used to obtain data and to construct an answer to the user's natural language question.

Embodiments may be implemented where a portion or all of the patterns can be inferred from the schema of the underlying structured data. Continuing the example, above, if the data exposes a number of columns, where the columns are labeled "Violent Crime", "Robbery", "Domestic Crime", etc. the pattern that the user can input can be structured in a form of "{Column_Name} in {City}" and the {Column_Name} can be one of these column names. This makes the engine smarter by relying on the structured data it operates on. While the preceding example illustrates usage of column names, embodiments are not limited only to column names. Rather, alternative or additional embodiments may include other types of semantics that are being applied.

Patterns can also contain enums, which is a type with a fixed set of constants, for certain often used variations of a phrase. For example, a pattern may include "crime rate {for|in} {City}" where for and in are the elements of the enum and represent common variances in questions seeking the same information.

The user can also provide information about the type of the data that they are looking for or providing. For example, a user may inject hints. For example, a user may hint that they are asking for an answer (or that they are sending information) that should be a number and that they are looking for text as a result. With this, and given the structure of the underlying data, the system will fetch values that make sense in the context.

Embodiments may additionally or alternatively include functionality to allow the user select data and provide information as to the type of data. For example, a user could select one or more of an Excel® workbook, a table in a Word® document, comma separated elements in a textbox, etc. The user could then indicate the type of the data. For example, the user could select a list of cities and provide an indication to the system that these are cities. Additionally or alternatively, the system could also determine the type by looking at the column header of the selected area or even by inspecting the further context of the document. This structured input can be used to match against one or more pattern from the query patterns 106 that the engine 102 understands and provide the user 100 a smart choice of which patterns can be applied. In particular, by the system knowing what information a user has available for making queries, the system can display in a user interface general query patterns that it has available that would fit the data elements that the user can use as input. The user could then select an appropriate query and populate variable elements from the information that they have available.

The following illustrates another example. The user has a set of cities, e.g., Seattle, San Francisco, Las Vegas, etc. The user selects these cities in a user interface and finds an experience where s/he can tell the system that these are cities. After that the system tells the user that there are 3 patterns that he could use with this data to augment his work: (1) Crime rate in City, (2) Current temperature in City, (3) Average income in City. The user chooses one of the choices for their set of cities and this selection is added to the user's query. The system, by knowing what data points a user has available, can prompt the user as to what query they might like to run. Once the user has selected a natural language query, the system can translate the query to semantically appropriate queries 112-1 through 112-$m$ to obtain results 114-1 through 114-$m$ from data stores 108-1 through 108-$n$ which can be consolidated to provide the result 116 to the user 100.

Figure 4:
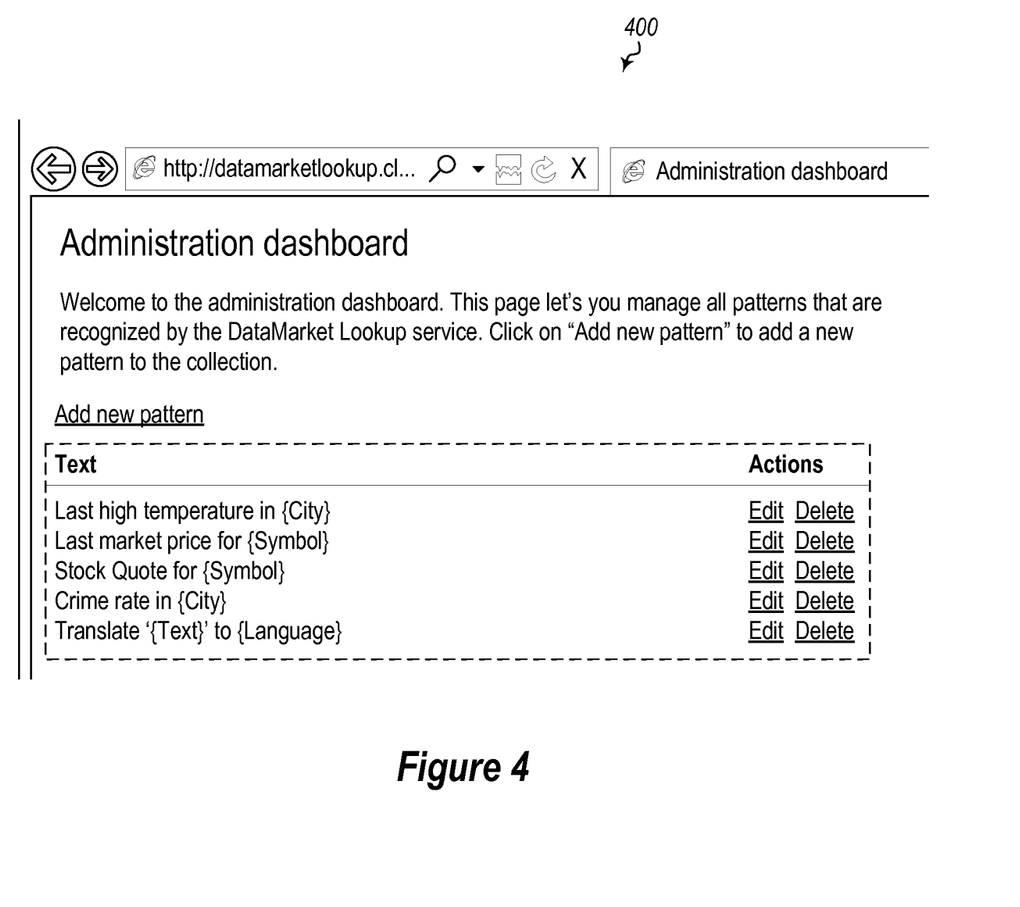
FIG. 4 illustrates an administration dashboard configured to allow an administrator to add, edit, and delete natural language queries.
Figure 5:
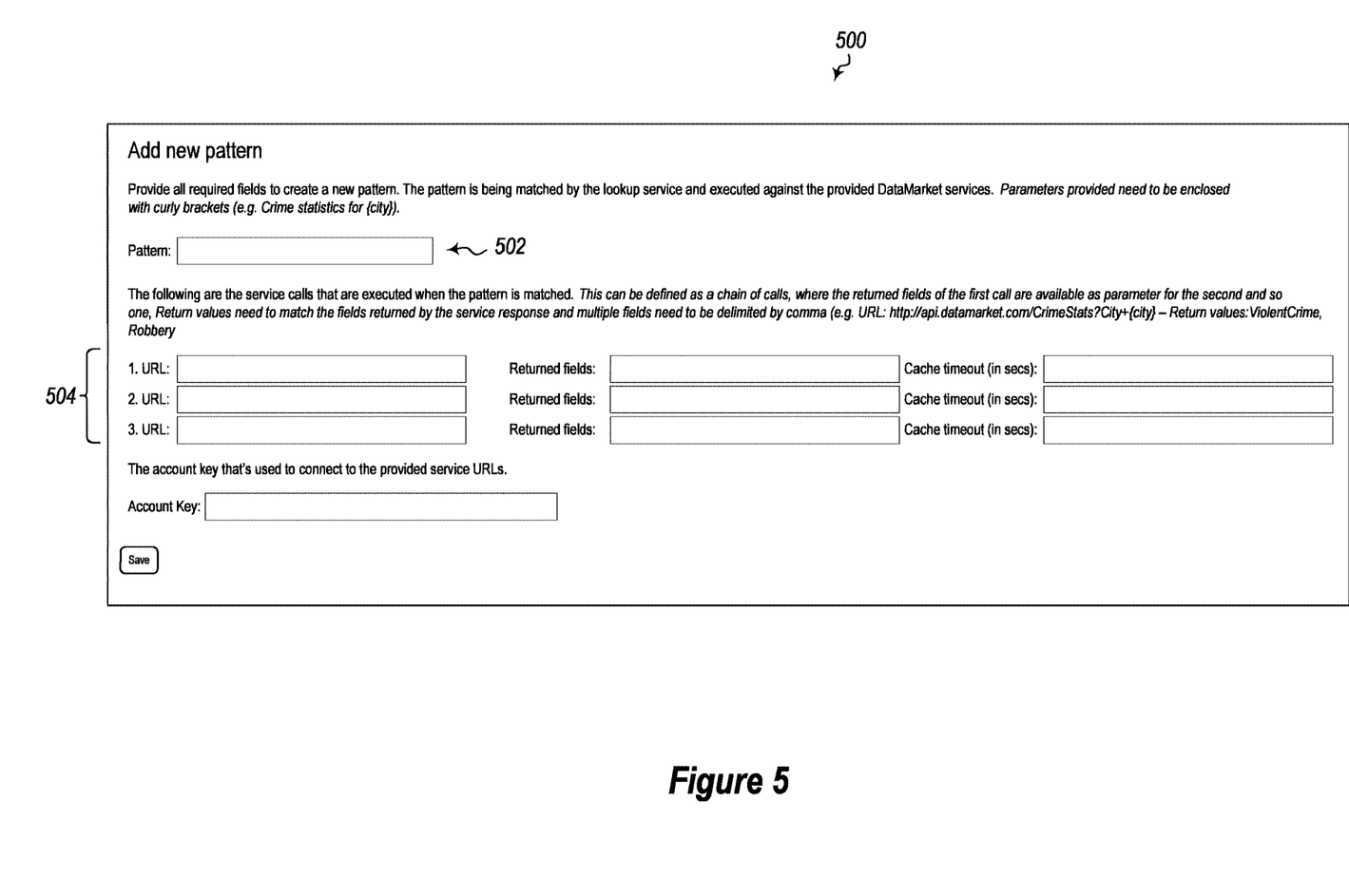
FIG. 5 illustrates additional details of the administration dashboard illustrating how an administrator can associate semantically appropriate queries with natural language queries.

Embodiments may include functionality for allowing an administrator to construct a query patterns such as query patterns 106 illustrated in FIG. 1. FIG. 4 illustrates an administrator dashboard user interface 400 which allows an administrator to manage query patterns. Using the administration dashboard 400, an administrator can add, edit, or delete query patterns. In particular, an administrator can determine what semantically appropriate queries map to what natural language queries. FIG. 5 illustrates a user interface 500 which illustrates an interface allowing an administrator to add a new natural language pattern. The administrator can enter a natural language pattern into a pattern interface 502. The administrator can then enter a number of semantically appropriate queries in the query fields 504. Note that in the example illustrated in FIG. 5, the query patterns entered into the query fields 504 are linked in a fashion that allows for parallel queries to be performed. However, in other embodiments, an administrator can indicate that queries are to be chained. In particular, when defining chained queries, an administrator can indicate that output from an earlier query can be used as input to a subsequent query. Thus, semantically appropriate queries can be chained to construct richer and more meaningful queries.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 6:
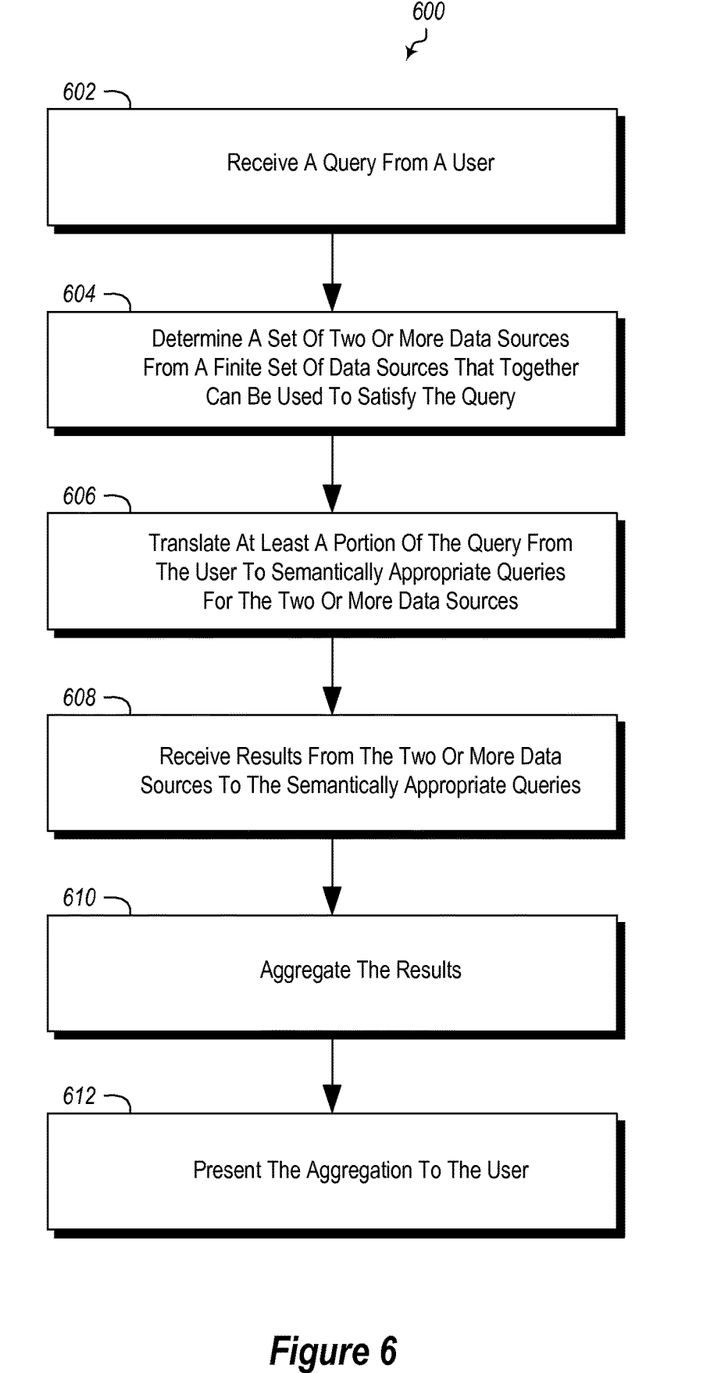
FIG. 6 illustrates a method of querying a finite set of data sources.

Referring now to FIG. 6, a method 600 is illustrated. The method 600 may be practiced in a distributed computing environment, and includes acts for querying a finite set of data sources. The method includes receiving a query from a user (act 602). For example, FIG. 1 illustrates and engine 102 in the cloud 104 receiving a query 110 from a user 100. In some embodiments, the method 600 may be practiced where the query received from the user is a natural language query.

The method 600 further includes determining a set of two or more data sources from the finite set of data sources that together can be used to satisfy the query (act 604). For example, the engine 102 can determine two or more structured data stores from the set of data store 108-1 through 108-$n$. These two or more structured data stores may have information that can satisfy the users query.

In some embodiments, the method 600 may be practiced where determining a set of two or more data sources includes identifying data sources that can be used together. For example, identifying data sources that can be used together may include identifying data sources that can be used together based on at least one of licensing (including, for example, cost to access data in a particular data store), terms of use, data structures of the data sources, compatibility of inputs and outputs, or data set purposes. For example, licensing restrictions or requirements may require that certain fees be paid to access certain data sources or that certain data sources be used together or not be used together. Similarly, terms of use requirements may have similar restrictions on the system. In another example, the manner in which data is organized in various repositories may make that data more suitable for use with other repositories. Thus, those repositories may be used together. For example, some data stores may be more suitable for language translation queries, while other data stores are more suitable for reporting sports scores, weather, or financial information.

In an alternative or additional embodiment, determining a set of two or more data sources may include identifying data sources based on previous user interaction to select data sources. For example, previous user searches may be used to determine appropriate data sources. The previous user interaction may be indicative of the type of data stores or information that a user searches for. Thus, the system may develop preferences for one data store or type of data store over another data store or type of data store.

The method 600 further includes translating at least a portion of the query from the user to semantically appropriate queries for the two or more data sources (act 606). For example, the query 110 may be translated to semantically appropriate queries using the query patterns 106. These semantically appropriate queries can be used to query two or more of the data stores 108-1 through 108-$n$.

As will be detailed below, querying the data stores could be done in parallel, series, or in other appropriate fashions. For example, illustrating now a serial query scenario, a user 100 could submit a query 110. The query 110 could be matched to a pattern from the set of patterns 106, where the matched pattern is a pattern semantically appropriate for the data store 108-1. A query 112-1, that is semantically appropriate for the data store 108-1 may be generated and run against the data store 108-1 resulting in the result 114-1. This result 114-1 could be used to generate a second query 112-2 which is then run against a different data store 108-2, resulting in a result 114-2. This may be the result 116 returned to the user, or additional queries may be performed in the serial fashion described against different data stores in the set of data stores 108-1 though 108-$n$ until an appropriate result is found.

In a parallel example, the query 110 may be translated to two or more queries, such as queries 112-1 and 112-2 that are semantically appropriate queries to be run against data stores 108-1 and 108-2 respectively. These two queries 112-1 and 112-2 can be run in parallel and their results aggregated to produce the result 116 that is returned to the user 100.

The method 600 further includes receiving results from the two or more data sources to the semantically appropriate queries (act 608). For example, as illustrated in FIG. 1, results 114-1 and 114-2 may be received from as a result of queries 112-1 and 112-2 to the data stores 108-1 and 108-2 respectively.

The method 600 further includes aggregating the results (act 610). For example, as illustrated in FIG. 1, results 114-1 and 114-2 may be aggregated into the result 116. The method 600 further includes presenting the aggregation to the user. For example, the results 116 may be returned to the user.

As illustrated above, the method 600 may be practiced where semantically appropriate queries are run in series and where aggregating comprises using results from one data source for a query for another data source. For example, embodiments are illustrated above where the query 112-2 is formed using the result 114-1 such that the aggregation occurs by using one result to construct a later query.

Alternatively or additionally the method 600 may be practiced where semantically appropriate queries are run in parallel and parallel results are aggregated. For example, queries 112-1 and 112-2 may be run independent of each other, but the results 114-1 and 114-2 may be aggregated once both results are received.

The method 600 may be practiced where aggregating queries comprises aggregating one or more cached queries. For example, one or more of the queries 112-1 through 112-m may be run at some point (either independently or in fulfilling a previous user query 110), and the corresponding result(s) 114-1 through 114-m cached at the engine 102. When a subsequent query 110 is run, the cached result may be used to satisfy the query 110.

The system illustrated herein may be extensible in that while the system is able to access a fixed set of data stores, additional third party data stores can be added to the set of data stores accessible by the system. In particular, various third parties are able to subscribe to data platform services to make their data available through the data platform services. Typically, the data platform services can obtain financial reward either by charging content providers a fee to host a particular data store or by charging users to access data from data stores while possibly passing on a portion of the collected fee back to providers of data in the data stores. Thus, it may be beneficial for data platform service providers and data providers to collaboratively work together to increase the number of data stores available on a data platform.

Embodiments of the method 600 may be practiced where the user query is based on at least one system prompt indicating the types of queries that a user can ask. For example, in the examples illustrated above, embodiments of the system can identify the types of data a user has available. For example, the user may have available a list of cities. The system can identify that the user has an available list of cities in a dataset. The system can then provide hints as to what queries the user may wish to ask, such as "what is the crime rate of a given city" or "what is the temperature in a given city".

Further, the methods may be practiced by a computer system including one or more processors and computer readable media such as computer memory. In particular, the computer memory may store computer executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer readable storage media and transmission computer readable media.

Physical computer readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer readable media to physical computer readable storage media (or vice versa). For example, computer-executable instructions or data structures received over a network or data link can be buffered in RAM within a network interface module (e.g., a "NIC"), and then eventually transferred to computer system RAM and/or to less volatile computer readable physical storage media at a computer system. Thus, computer readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method-implemented at a computer system that includes one or more processors, the method comprising:
    receiving user input that includes at least:
    a natural language query;
    an identity of a type of data that the query is providing; and
    an identity of a format and type of data the query is looking for as a specific answer to the query;
    determining at least two data sources of the plurality of data sources that can be used to satisfy the query, wherein the determining the least two data sources that can be used to satisfy the query includes identifying data sources that can be used together based at least upon licensing and terms of use of the identified data sources;
    from a plurality of data patterns, determining a data pattern associated with each data source of the at least two data sources of the plurality of data sources that can be used to satisfy the query;
    for the each data source of the at least two data sources and using the data pattern associated with the each data source of the at least two data sources, translating the query into a semantically-appropriate query for the each data source of the at least two data sources, wherein the translating the query comprises selecting a query pattern that queries data sources that return results of a requested result data type;
    querying the each data source of the at least two data sources using the semantically-appropriate query for the each data source of the at least two data sources, wherein the querying the each data source of the at least two data sources comprises querying a first data source and a second data source in parallel;
    receiving results of the querying of the each data source of the at least two data sources from the at least two data sources;
    aggregating the received results of the querying of the each data source of the at least two data sources into a single unified result, wherein the aggregating the received results includes combining first results of querying the first data source with second results of querying the second data source; and
    returning the single unified result as an answer to the user input, wherein the answer is returned in the format and type of data the query is looking for as specified in the user input.

2. The method of claim 1, further comprising receiving input data, and wherein querying each data source of the at least two data sources comprises supplying the input data as part of the semantically-appropriate queries.

3. The method of claim 1, wherein querying each data source of the at least two data sources comprises use of a chained query, including querying a first data source, and then querying a second data source using results of querying the first data source.

4. The method of claim 3, wherein the single unified result comprises a result of querying the second data source using results of querying the first data source.

5. The method of claim 1, wherein receiving the query comprises receiving a query entered via a spreadsheet.

6. A computer program product comprising one or more hardware-based memories having stored thereon computer-executable instructions that, when executed by one or more processors of a computer system, cause the computer system to perform operations including:
    receiving user input that includes at least:
    a natural language query;
    an identity of a type of data that the query is providing; and
    an identity of a format and type of data the query is looking for as a specific answer to the query;
    determining at least two data sources of the plurality of data sources that can be used to satisfy the query, wherein the determining the least two data sources that can be used to satisfy the query includes identifying data sources that can be used together based at least upon licensing and terms of use of the identified data sources;
    from a plurality of data patterns, determining a data pattern associated with each data source of the at least two data sources of the plurality of data sources that can be used to satisfy the query;
    for the each data source of the at least two data sources and using the data pattern associated with the each data source of the at least two data sources, translating the query into a semantically-appropriate query for the each data source of the at least two data sources, wherein the translating the query comprises selecting a query pattern that queries data sources that return results of a requested result data type;
    querying the each data source of the at least two data sources using the semantically-appropriate query for the each data source of the at least two data sources, wherein the querying the each data source of the at least two data sources comprises querying a first data source and a second data source in parallel;
    receiving results of the querying of the each data source of the at least two data sources from the at least two data sources;
    aggregating the received results of the querying of the each data source of the at least two data sources into a single unified result, wherein the aggregating the received results includes combining first results of querying the first data source with second results of querying the second data source; and
    returning a single unified result as the answer to the user input, wherein the answer is returned in the format and type of data the query is looking for as specified in the user input.

7. The computer program product of claim 6, further comprising computer-executable instructions that also cause the computer system to receive input data, and wherein querying each data source of the at least two data sources comprises supplying the input data as part of the semantically-appropriate queries.

8. The computer program product of claim 6, wherein querying each data source of the at least two data sources comprises use of a chained query, including querying a first data source, and then querying a second data source using results of querying the first data source.

9. The computer program product of claim 8, wherein the single unified result comprises a result of querying the second data source using results of querying the first data source.

10. The computer program product of claim 6, wherein receiving the query comprises receiving a query entered via a spreadsheet.

11. A computer system, comprising:
one or more processors; and one or more hardware storage devices having stored thereon computer-executable instructions that, when executed by the one or more processors, cause the computer system perform operations including:
receiving user input that includes at least:
a natural language query;
an identity of a type of data that the query is providing; and
an identity of a format and type of data the query is looking for as a specific answer to the query;
determining at least two data sources of the plurality of data sources that can be used to satisfy the query, wherein the determining the least two data sources that can be used to satisfy the query includes identifying data sources that can be used together based at least upon licensing and terms of use of the identified data sources;
from a plurality of data patterns, determining a data pattern associated with each data source of the at least two data sources of the plurality of data sources that can be used to satisfy the query;
for each data source of the at least two data sources and using the data pattern associated with the each data source of the at least two data sources, translating the query into a semantically- appropriate query for the each data source of the at least two data sources, wherein the translating the query comprises selecting a query pattern that queries data sources that return results of a requested result data type;
querying the each data source of the at least two data sources using the semantically-appropriate query for the each data source of the at least two data sources, wherein the querying the each data source of the at least two data sources comprises querying a first data source and a second data source in parallel;
receiving results of the querying of the each data source of the at least two data sources from the at least two data sources;
aggregating the received results of the querying of the each data source of the at least two data sources into a single unified result, wherein the aggregating the received results includes combining first results of querying the first data source with second results of querying the second data source; and
returning a single unified result as the answer to the user input, wherein the answer is returned in the format and type of data the query is looking for as specified in the user input.

12. The computer system of claim 11, further comprising computer-executable instructions that also cause the computer system to receive input data, and wherein querying the each data source of the at least two data sources comprises supplying the input data as part of the semantically-appropriate queries.

13. The computer system of claim 11, wherein querying the each data source of the at least two data sources comprises use of a chained query, including querying a first data source, and then querying a second data source using results of querying the first data source.

14. The computer system of claim 13, wherein receiving the query comprises receiving a query entered via a spreadsheet.

15. The computer system of claim 11, wherein the single unified result comprises a result of querying the second data source using results of querying the first data source.

* * * * *